H. BREISACHER.
Preparing Gray Squirrel Skins.
No. 208,510.                    Patented Oct. 1, 1878.
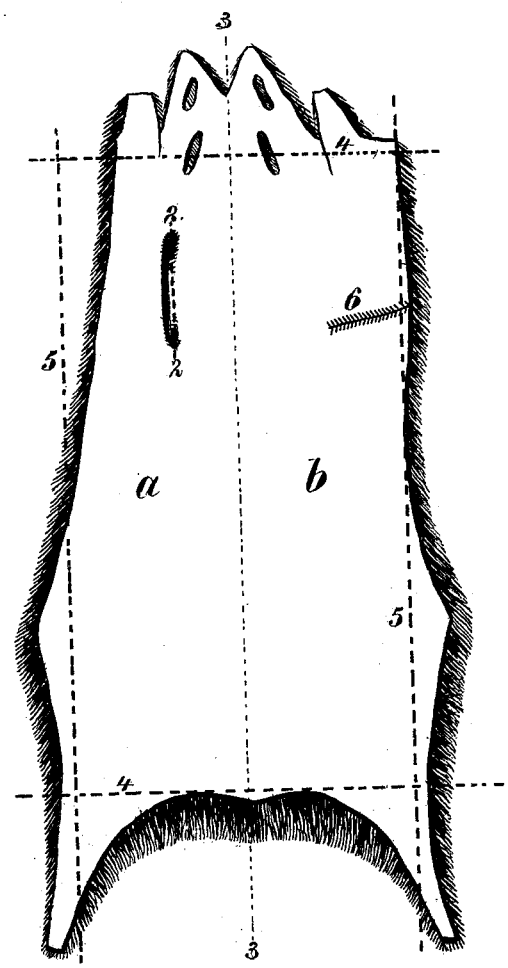
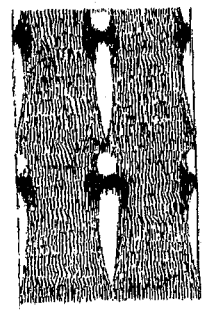
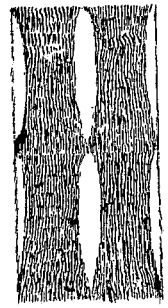
Witnesses
Chas H. Smith
Geo. T. Pinckney
Inventor
Hieronimus Breisacher
per Lemuel W. Serrell
atty.

UNITED STATES PATENT OFFICE.

HIERONIMUS BREISACHER, OF NEW YORK, N. Y.

IMPROVEMENT IN PREPARING GRAY-SQUIRREL SKINS.

Specification forming part of Letters Patent No. 208,510, dated October 1, 1878; application filed August 17, 1878.

*To all whom it may concern:*

Be it known that I, HIERONIMUS BREISACHER, of the city and State of New York, have invented an Improvement in Preparing Gray-Squirrel Skins, of which the following is a specification:

It is usual to skin the squirrel, turning the skin inside out from the hind parts toward the head, so that the skin is somewhat in the form of a bag. It is cleaned and rendered soft and pliable in the usual manner.

In cutting the skins to spread them out flat for manufacturing mantles and linings for cloaks, muffs, &c., it is usual to separate the skin along the belly part, which is white, and then cut off the paw portion of the skin and sew the edges together at the line 2 2 of Figure 1, which shows the inside of a squirrel's skin, the right-hand half of which is prepared according to my improvement and the left-hand half is in the ordinary condition.

When the front-paw portions have been removed and sewed up, as at 2 2, the skins are sewed together, and produce an appearance similar to that illustrated in Fig. 2, there being a streak of white hair at the junction of the edges of each two skins. In this manner of preparing the skin the dark fur of the outer part of the front paw is cut away, and the general appearance of the lining or mantle is a light color in consequence of the white hair.

Efforts have been made to utilize the dark fur on the outsides of the paws, and an incision has been made from the shoulder portion of the skin toward the head or nose, and the skin of the paw has been turned around into this portion and sewed in with a seam on each side, and the fur of the paw lies the wrong way. Either of these methods involves considerable labor, and the skin is not as wide at the head end as it is after the skin is prepared in my improved manner, and there is considable loss, because the skins have to be cut as parallelograms in order to be sewed together into the lining or mantle.

By my improvement I effect a great saving in preparing the squirrel-skins, because the front part of the skin is made wider, and a less number of skins is required for a given size of garment, and the labor of preparation is very much lessened.

I separate the skin longitudinally through the belly portion, as usual, and then insert the knife into the paw portion of the skin, and cut the same open on a transverse line running down the inside of the paw and across the breast portion of the skin to the edge. This manner of cutting the skin leaves the skin whole; but there is a fullness around the paw and neck portions of the skin if it is spread out. I now wet the skin and stretch the neck portions transversely, so as to take up the fullness that results from the paw-skin, and render the neck part of the skin as wide, or nearly so, as the back portion of the skin. The skin is allowed to dry after it has thus been stretched, and is trimmed off square, as indicated by the dotted lines 4 4 and 5 5.

The dotted line at 3 3 is the center of the skin at the back of the animal, and by a comparison of the side *b* of the skin prepared according to my improved method with the side *a* of the skin prepared in the ordinary manner the increased size of my skin will be manifest.

By reference to Fig. 3 it will be seen that the lining or mantle made of skins prepared in my improved manner is darker, because the dark fur of the paw is brought into the central portion of the side seam, and not only divides the white fur into two parts, but lessens the quantity of the white fur.

If the skin is too full toward the edge to flatten out, as aforesaid, a small tapering gore may be removed and the edges sewed together, as shown by the seam 6.

In cases where the squirrel-skin is cut all the way down the back, it is only necessary to cut the belly portion sufficiently for cutting the paws transversely and stretching the skin in the manner before described.

I claim as my invention—

The method herein specified of treating tanned gray-squirrel skins, consisting in separating the skins longitudinally at the breast or belly transversely through the inner surfaces of the paws and across the breast, wetting, stretching, and trimming, substantially as set forth.

Signed by me this 14th day of August, A. D. 1878.

H. BREISACHER.

Witnesses:
GEO. T. PINCKNEY,
CHAS. H. SMITH.